Feb. 13, 1973 A. BALINT 3,716,299
FRAME COUNT CUER FOR CONTINUOUS PHOTOGRAPHIC FILM PRINTER
Filed Sept. 1, 1971 3 Sheets-Sheet 1

Inventor:
Andrew Balint.
By William K. Say Atty

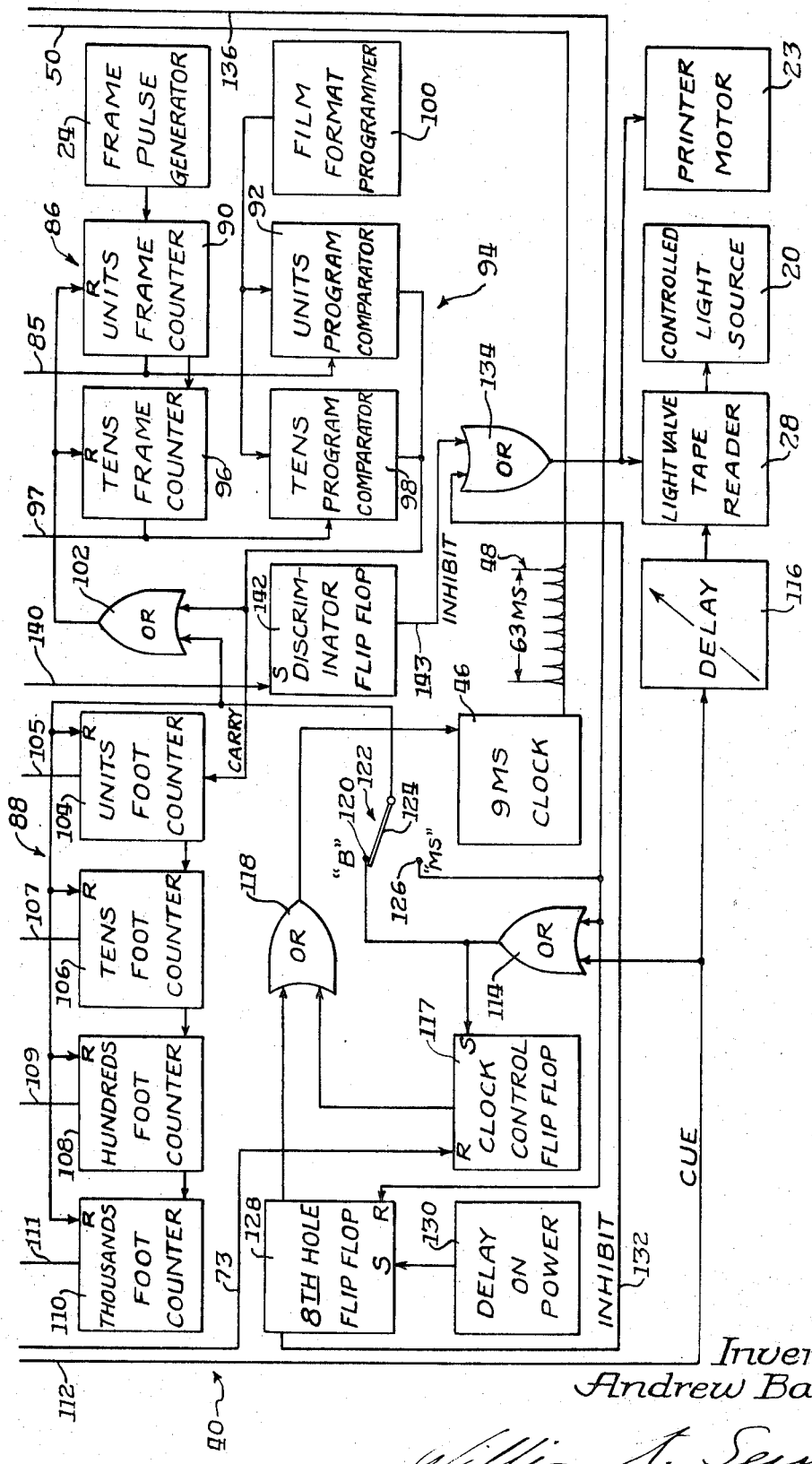

United States Patent Office 3,716,299
Patented Feb. 13, 1973

3,716,299
FRAME COUNT CUER FOR CONTINUOUS PHOTOGRAPHIC FILM PRINTER
Andrew Balint, Park Ridge, Ill., assignor to Bell & Howell Company, Chicago, Ill.
Filed Sept. 1, 1971, Ser. No. 176,933
Int. Cl. G03b 27/78
U.S. Cl. 355—83      16 Claims

ABSTRACT OF THE DISCLOSURE

A frame count cuer for controlling the operation of a continuous photographic film printer. As the "preprint" film and overlaying "raw stock" are passed through the printer, a signal is generated corresponding to the quantity of film drawn across the exposure aperture. A counter is driven by the signal and provides a progressive integral footage and frame count of the amount of film passing through the printer. The information from a punched scene length tape is used to set a storage unit to the desired scene length and the setting of the storage unit is compared with the counter by a comparator. Upon coincidence, a cue signal is fed from the comparator to the printer light valves. The light valves are preset with information obtained from a punched paper tape in accordance with a predetermined preferred light level and hue for the scene to be printed.

BACKGROUND OF THE INVENTION

This invention relates to an apparatus for controlling the operation of a continuous photographic film printer, and more particularly relates to an apparatus for automatically controlling the light valves of such a printer so as to provide intensity and hue correction for the scene being printed.

During the operation of a continuous film printer, an unexposed film or "raw stock" is placed in overlaying relation to a "preprint" film. The "preprint" film and the overlayed "raw stock" are in sprocket hole registration and driven by a single sprocket wheel across an aperture for exposure by a controlled light source. The "raw stock" is thus exposed in accordance with the image of the "preprint" film and thereafter developed by conventional means.

In connection with the filming of the "preprint," the various scenes which make up the complete film are frequently photographed at different locations and under varying lighting conditions. To minimize or eliminate the lighting and color variations which occur as a result of variations in lighting during the initial filming, each of the scenes of the "preprint" often require different optimum printing light levels and color balance during exposure of the "raw stock." Prior to exposure of the "raw stock" the "preprint" film is visually inspected by a skilled operator for the purpose of determining the intensity and hue of the compensation desired for each scene. According to conventional practice, lighting compensation for each scene is recorded by punching a paper tape. During printing, the punched tape is utilized to control the light valve of a variable light source focused upon the printer exposure aperture.

In accordance with the illustrated embodiment, the length of the scene to which the light setting relates is similarly recorded upon a second punched paper tape in binary coded decimal (BCD) code. This information may be in the form of a film length measure starting at the termination of the last scene and is termed hereinafter the "batch" method of scene length measurement. Alternatively, the information may be in the form of a film length measure starting at a predetermined starting position on the film leader such as a punched "sync hole" and is hereinafter termed the "milestone" method of measuring scene length. Thus, during the initial viewing of the master "preprint" film two tapes are punched, a first recording the scene light level and color correction desired and a second recording the scene length to which the correction corresponds following either the "batch" or "milestone" methods of scene length measurement. The use of separate scene length and light control tapes is particularly convenient since this combination readily adapts to practices presently in use. Conventionally, the operator in a photographic laboratory will punch a first tape carrying the lighting intensity information for control of the light valves and apply notches or magnetic patches to the film indicating the location of a scene change. As will subsequently be further described, in lieu of notching or patching, the operator more conveniently punches a second tape carrying scene length information thus making the illustrated embodiment totally compatible with present laboratory practices.

As previously mentioned, the "preprint" film and "raw stock" are in sprocket hole registration and driven through the printer. In accordance with known methods, a pulse generator provides an output signal related to the amount of film driven across the exposure aperture. The actual film travel is compared to the scene length information recorded upon the scene length tape and when the two sources of information coincide, a cue signal is generated. The cue signal actuates the light valves causing them to attain the desired light and color correction for the scene being printed. Thus, the light printing level and color correction are adjusted between each scene upon command in accordance with the recorded tape information.

A particularly suitable light source for use with the illustrated embodiment is manufactured by Bell & Howell Company, and includes dichroic mirrors which serve to separate a spectral light source into three primary color light beams. Three light vanes, each of which relates to a primary color are adjustably set to intercept a selected portion of the light in one of the primary color beams. Each light valve additionally includes a bar-type adder unit having a plurality of solenoid actuated slides wherein the desired vane position is stored. Signals from the light valve tape representing the selected hue correction factors are applied to the slide solenoids causing the adder unit to expand linearly by an amount corresponding to the correction desired. The information in the bar-type adder unit is converted to an angular rotation of a vane memory and stored therein. The angular position of the vane memory is transferred to the vanes upon receipt of a cue signal by actuating a vane solenoid which in turn moves a vane into the path of the primary color beam of an amount determined by the angular position of the vane storage memory. Thus, in response to a cue signal the lighting information stored in the valve is transferred to its respective vane and the valve is cleared to receive the lighting information relating to the next scene to be printed.

A main purpose of this invention is to provide a frame count cuer which monitors the quantity of film passing across an exposure aperture and compares this measure with a prerecorded program. Upon the occurrence of a selected condition, the cuer generates a cue signal which causes the level and hue of the printer exposure light to adjust in accordance with a recorded program representing a preferred scene correction.

DESCRIPTION OF THE DRAWINGS

FIG. 3 is a schematic block diagram of certain of the components illustrated in FIG. 1, and in combination with FIG. 2 provides a complete illustrative diagram.

DESCRIPTION OF THE PREFERRED EMBODIMENT

General

Figure 1:
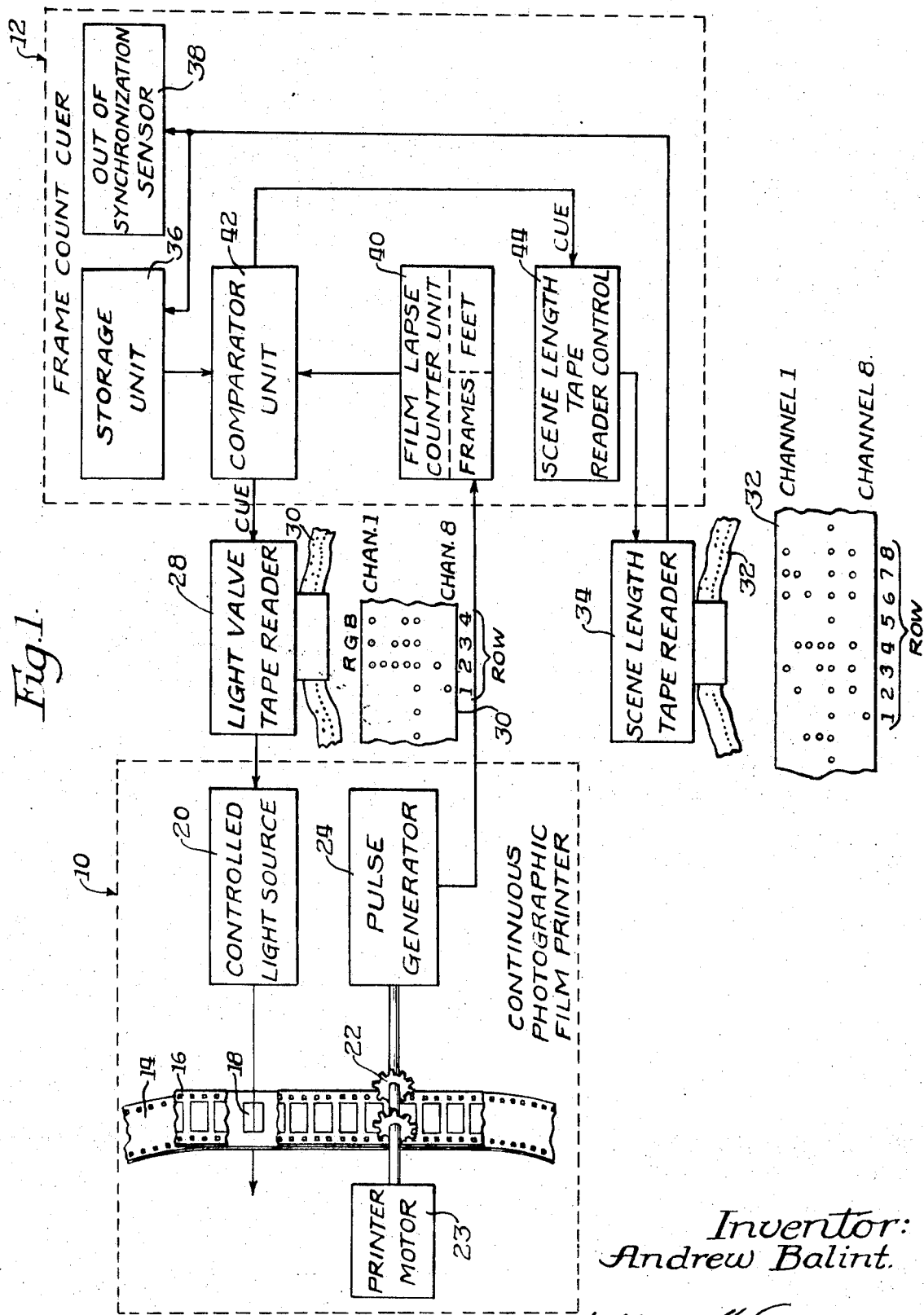
FIG. 1 is a block diagram, partially in schematic, illustrating a photographic printer in combination with a frame count cuer including certain features of this invention.

With reference to FIG. 1, a continuous photographic film printer 10 is illustrated together with a frame count cuer 12, including certain features of this invention. The photographic film printer 10 is symbolically illustrated in combination with a film of "raw stock" 14 in overlaying relation to a "preprint" film 16. Both the "raw stock" 14 and the "preprint" 16 are in sprocket hole registration and drawn across an exposure aperture 18. Serving to expose the "raw stock" 14 with the "preprint" image is a controlled light source 20 focused at the aperture 18. The controlled light source 20 includes light valves which vary the intensity of the red, green and blue components of the source, thereby permitting the intensity and relative composition of the light to be selectively varied. The "preprint" 16 and "raw stock" 14 are driven across the exposure aperture 18 by a sprocket wheel 22 which is connected to and rotatably driven by means of a printer motor 23. Coupled to the sprocket wheel 22 is a pulse generator 24 which generates a pulsed signal related to the linear quantity of film drawn across the exposure aperture 18. In the illustrated embodiment, the pulses are preferably generated independently of any information contained upon the preprint film 16 and are coupled to the frame count cuer 12.

The light valve settings of the light source 20 are controlled by a light valve tape reader 28 which steps a prepunched paper tape 30 carrying the hue and intensity information for each of the "preprint" scenes. As illustrated, the preferred tape 30 is eight channels wide and punched with four rows or steps carrying the lighting information for a single scene. The first row or step is generally blank with the exception of the first scene. Serving to indicate the start of the first scene, the eighth channel of the first row of the first scene carries a singular hole. The second, third, and fourth rows respectively, carry information relating to the red, green, and blue hues. As will be subsequently described, the light valve tape reader advances in response to a start signal until the eighth channel hole is sensed. Thereafter, the tape steps four positions in response to a cue signal from the frame count cuer 12 setting the slides of the red, green, and blue valves.

The cue signal initiates two operations. First, it causes the information stored in the valve slides of the controlled light source 20 to be transferred to the light vanes so as to adjust the hue and intensity of the light source in preparation for printing the first scene. Secondly, the tape information is stored in the slides of the light valves and corresponds to the lighting information for the next scene. It should be noted that the slides in the light valve are set to their memory position before the related scene is printed and transferred to the vanes in response to a cue signal.

Scene length information is preferably recorded upon a punched paper scene length tape 32 coded in binary coded decimal form and read by a scene length tape reader 34. As illustrated in FIG. 1, the tape 32 is provided with eight channels and punched in eight rows or steps. The first row or step is generally blank with the exception of an eighth hole punch at the end of the tape leader. Channels one through four, of rows 2, 3, 4 and 6 carry footage information, and rows 7 and 8 provide frame information. As will be subsequently described, row 5 is used for synchronization detection to assure that the tape 32 is in proper synchronization with the frame count cuer 12. Although the illustrated tape accommodates eight channels only six are used. It should be understood that although a particular valve and scene length tape configuration have been described various other tape formats and information media may be used without departing from the spirit of this invention.

The film length information relating to the subsequent scene length is fed to the frame count cuer from the scene length tape reader in binary coded decimal form. Serving to store the scene length information is a storage unit 36 forming part of the frame count cuer. As illustrated, the fifth row of the scene length tape is blank. An out-of-synchronization sensor 38 senses the fifth row information and in the event the tape, due to a malfunction, is out of synchronization the reader 34 will detect such holes when in the fifth step. The apparent punch holes in the fifth step are noted by the out-of-synchronization sensor 38 which interrupts operation of the printer 10 thus facilitating correction of the malfunction before valuable film footage is wasted.

The pulses from the frame pulse generator 24 are fed to a film lapse counter unit 40 which maintains a progressive count of the film quantity driven across the aperture. The film length information is stored in the counter 40 in integral feet and frames having a unit length less than a foot. Alternatively, the film length information may be stored in feet and fractions of a foot, or in frames alone. However, the illustrated combination of a footage and frame count is to be preferred since it corresponds to the practice generally followed in the trade. Laboratory technicians are generally trained to perceive a scene length in terms of feet, and portions of a foot in frames, and the illustrated embodiment follows such training practices.

The film length signal from the tape reader 34 is compared with the counter level by a comparator unit 42, and upon a coincidence between the counter unit 40 and storage unit 36, a cue signal is fed to the light valve tape reader 28 and to a scene length tape control unit 44 which steps the reader 34 eight rows. The cue signal causes the information stored in the slides to transfer to the vanes and the tape reader 28 to step resetting the slides with information for the next scene.

FRAME COUNT CUER

Storage

Figure 2:
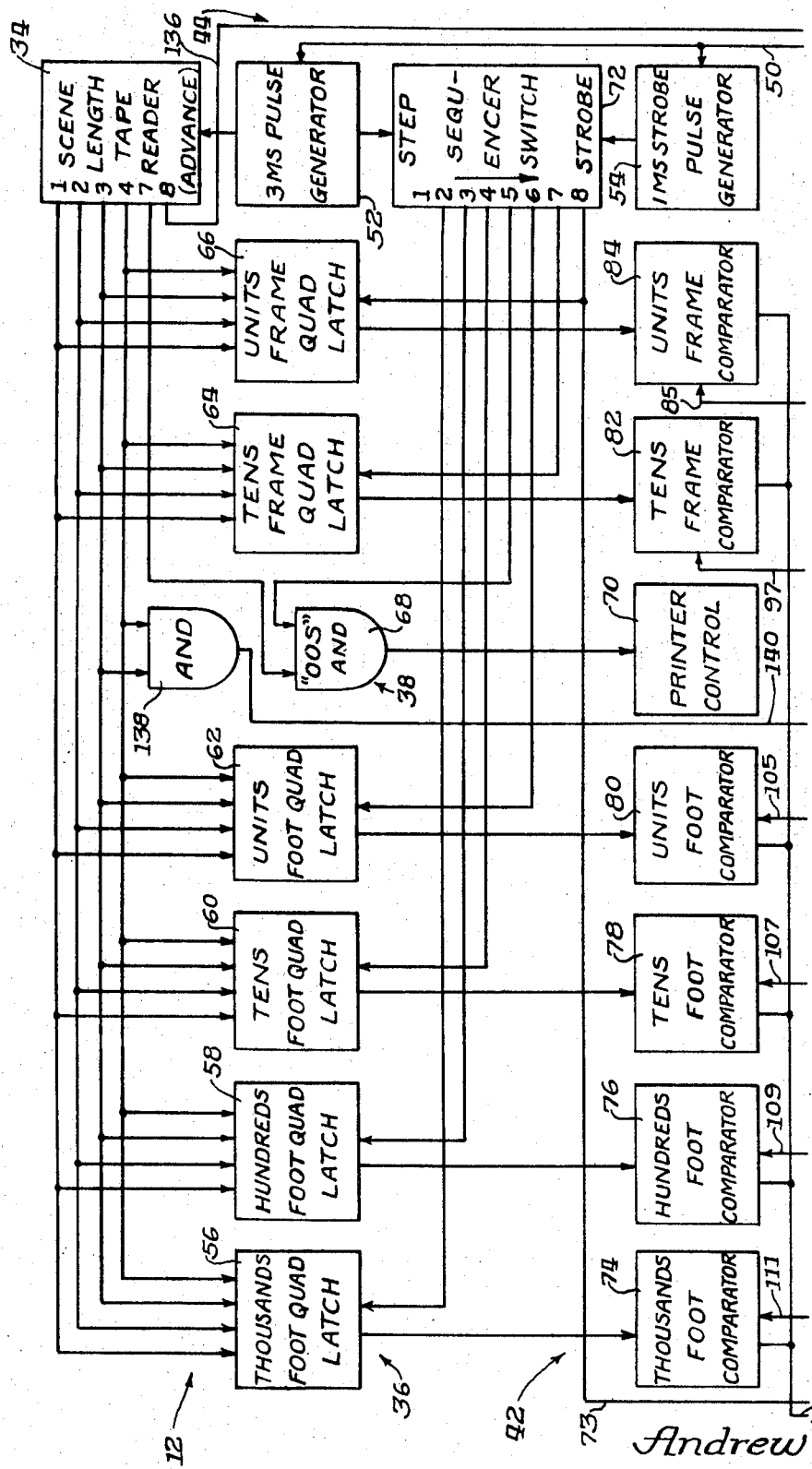
FIG. 2 is a schematic block diagram of certain of the components illustrated in FIG. 1.

To facilitate understanding, FIGS. 2 and 3 are arranged so that they may be aligned to provide a complete operative block diagram of the frame count cuer 12. Although the subsequent discussion will describe certain timing periods and relationships for various components of the frame count cuer, it should be understood that the time periods are only exemplary and provided by way of illustration to facilitate an understanding of the embodiment. The transfer of information from the scene length tape reader 34 to the storage unit 36 and the out-of-synchronization sensor 38 is controlled by a nine millisecond clock 46. The clock 46 is turned on for a period of sixty-three milliseconds, thus generating a total of eight distinct pulses, as illustrated at 48.

The timing pulses from the clock are fed via a line 50 to a three millisecond pulse generator 52, and to a one milli-second strobe pulse generator 54. In response to each clock pulse the three millisecond pulse generator 52 produces a square-wave output of three millisecond duration which is fed to the scene length tape reader 34 for stepping the reader one row. As previously mentioned, the information for the storage unit 36 is punched in the first four channels of the tape and the out-of-synchronization sensor 38 in the seventh channel. The output of each of the first four channels is connected to the storage unit 36, which includes a thousand foot quad latch 56, a hundred foot quad latch 58, a ten foot quad latch 60 and a unit foot quad latch 62. Additionally, the output of the first four channels of the tape reader is connected to a tens frame quad latch 64 and a units frame quad latch 66. If desired, each of the individual quad latches may be provided with a visual indication to permit the user to read the integral footage and frame length information which has been transferred to the storage unit 36.

The output of channel seven of the scene length tape reader 34 is fed to the input of an "OOS" And gate 68, which forms part of the out-of-synchronization sensor 38. During punching of the scene length information in rows 2, 3, 4, 6, 7 and 8, a channel seven hole punch is made in the tape. Thus, the absence of the channel seven hole punch indicates the "OOS" row of the tape. The output of the AND gate 68 is fed to a printer control unit 70. The control unit 70 interrupts the printer operation in the event the scene length tape falls out-of-synchronization with the frame count cuer 12.

The output of the three millisecond pulse generator 52 is fed to a sequensor switch 72 which steps upon the trailing edge of the three millisecond pulse. The sequensor switch serves to selectively connect the individual quad latches to the one millisecond strobe generator 72 which in turn opens a selected quad latch or the "OOS" AND gate 68. The switch steps from the thousands 56, to the hundreds 58 and down to the unit frame 62 quad latch. Each of the step positions of the sequensor switch 72 correspond to one row on the scene length tape 32. The first row carries an eight hole punch indicating the termination of the tape leader as previously mentioned. The one millisecond strobe pulse is progressively switched from the thousand foot quad latch 56 to the units frame quad latch 66 by the three millisecond pulse generator and in response to the falling edge of the one millisecond pulse, the respective quad latches store the information which appears at the output of the scene length tape reader. The first pulse from the clock 46 steps the switch 72 to an open position, since this tape row only contains a channel eight hole punch indicating tape leader termination. The second pulse steps the tape reader 34 to the second row, and the one millisecond strobe pulse generator 54 is coupled, by the sequensor switch 72, to the thousand foot quad latch 56 thereby causing it to set in accordance with the information punched in the second row of the tape 32. Upon the completion of the first four pulses from the clock, the information in the second through the fourth row of the tape is recorded in the thousands 56, hundreds 58 and tens 60 foot quad latches. The fifth pulse from the clock 46 switches the reader 34 output to the "OOS" AND gate. Under normal operating conditions, the fifth row of the tape 32 will be blank and therefore will be a no-signal condition at the output of the AND gate 68. In the event the tape 32 is out of sequence by being advanced a row or retarded a row, a channel seventh hole punch will be present generating a signal at the "OOS" AND gate in coincidence with a signal from the switch 72 at the alternate AND gate input. Under such conditions, the AND gate supplies an output signal which is coupled to the printer control unit 70. The printer control unit 70 interrupts operation of the printer 10 and provides a signal to the operator that the scene length tape is out of sequence. As previously mentioned, this assures that the printing will stop thus preventing film wastage. The last three pulses from the clock step the tape reader to the sixth, seventh and eighth rows and correspondingly set the units foot 62, tens frame 64, and the units frame 66 quad latches. The outputs from the respective quad latch units is fed to the comparator unit 42. The comparator unit comprises a thousands foot 74, a hundreds foot 76, a tens foot 78, a unit foot 80, a tens frame 82, and a units frame 84 comparator. The alternate input of the respective comparators are connected to the output of the film lapse counter 40.

Count

As previously mentioned, the film lapse counter 40 includes a frame counter 86 and a footage counter 88. The frame counter 86 is driven by the pulse generator 24 which feeds its input into a units frame counter 90. The units frame counter 90 provides a progressive count of the number of frames passing across the aperture 18. The output of the units frame counter 86 is fed to the units frame comparator 84 via line 85 as well as to a units program comparator 92 of a frame count comparator 94. Serving to carry the frame count over nine, is a tens frame counter 96 which is triggered by the units frame counter 90. After stepping the tens frame counter 96, the units frame counter 90 automatically resets to start the next progressive count. The output from the tens frame counter 96 is fed to the tens frame comparator 82 via conductor 97 as well as to a tens program comparator 98. Serving to control the frame count comparator 94, is a film format programmer 100 the output of which is fed to the tens program comparator 98 and the units program comparator 92 for comparison with the readings in the tens frame counter 96 and the units frame counter 90. When the reading of the film format programmer 100 corresponds to that which is read in the tens frame counter 96 and the units frame counter 90, an output signal is generated. During count-up, the comparators 92 and 98 outputs are shorted to ground; however, when a coincidence is indicated by an individual comparator the ground connection is opened. When both of the program comparators 92 and 98 indicate a coincidence, both grounds are open thereby providing a signal through an OR gate 102 indicating a coincidence logic.

The film format programmer 100 sets the tens 98 and units 92 program comparators for the particular film format being printed. Each of the various common film formats define a different number of frames per linear foot of film. Thirty-five millimeter film will contain sixteen frames, a 16 mm. film contains forty frames, a super 8 mm. film contains seventy-two frames and an 8 mm. film contains eighty frames per foot. The program preferably includes a suitable switching arrangement to allow the operator to select the program corresponding to the film being printed. For example, if the film format program is set for 35 mm. film the frame program comparator 94 will generate a coincidence signal when a count of sixteen is reached. The coincidence signal is coupled through the OR gate 102 to the reset inputs of the tens frame counter 96 and the unit frame counter 90 for reset in preparation for the next count. Serving to step the footage counter 88 of the counter unit 40, the coincidence signal is also fed to a units foot counter 104. As the frames of film are drawn across the exposure aperture 18 of the printer 10, the tens 96 and units 90 frame counters continue to periodically generate a coincidence signal which is carried to the units foot counter 104 and subsequently to a tens foot counter 106, a hundreds foot counter 108, and a thousands foot counter 110. The counters 104, 106, 108 and 110 are respectively connected to the comparators 80, 78, 76 and 74 via conductors 105, 107, 109 and 111. If desired, each of the counters 90, 96, 104, 106, 108 and 110 can be provided with a visual indication, so that the operator can readily ascertain the amount of film in frames and integral footage, and can compare the reading with the indication provided by the storage unit 36.

Control

When the output of the thousands foot 74, hundreds foot 76, tens foot 78, units foot 80, and the frame comparators 82 and 84 reach a coincidence indication their outputs will be opened with respect to ground, thereby providing a cue signal along conductors 112 to the input of an OR gate 114 and to a manually adjustable delay means 116. The delay means 116 serves to delay actuation of the tape reader 28 upon receipt of a cue signal. In response to the delayed cue, the slide settings are transferred from the slides to the vanes causing the vanes of the controlled light source 20 to set in accordance with the previously stored information. The delay means 116 allows the operator to compensate for the inherent response time of the controlled light source 20 and thus assure that the controlled light source 20 is adjusted during a frame line, rather than in the middle of a frame. In practice, the cue signal is programmed to occur just prior to the scene change and any additional delay required is introduced by the delay means 116.

The output of the OR gate 114 is fed to the set terminal of a clock control bistable flip-flop 117. The output of the flip-flop passes through an OR gate 118 to the nine millisecond clock 46 serving to activate the clock. The output of the OR gate 118 is also connected to a batch "B" terminal 120 of a single pole double-throw switch 122. The wiper 124 of the switch is connected to the remaining input of the OR gate 102 and to the reset terminals of the thousands 110, hundreds 108, tens 106, and units 104 foot counters for reset thereof. A remaining milestone "MS" pole 126 of the single pole double throw switch 122 is connected to the remaining input of the OR gate 102 for purposes to be subsequently described. As previously mentioned, in the "batch" method of film length measurement, the relative length of the scenes are indicated by a footage and frame count from the termination of the last scene. Thus, when the switch 122 is in the "batch" B position the cue signal from the comparator unit 42 is used to reset the footage counters 88, as well as the tens 96, and units 90, frame counters through the OR gate 102. In the "batch" position all of the counters are reset upon each occurrence of a cue signal. With the switch 122 in the "milestone" MS position, the counters are not reset upon the occurrence of the cue signal since, as previously mentioned, the scene lengths are measured from a mark upon the film leader and the count is progressive.

Serving to delay power to an eight-hole bistable flip-flop 128 upon energization of the frame count cuer 12 is a delay on power means 130. The delay on power means 130 assures that the remaining components of the cuer 12 will be properly set before power is applied to the flip-flop 128 thus preventing a malfunction in the systems logic sequence. Upon application of power, the flip-flop 128 is set. Setting of the flip-flop 128 produces an inhibit signal along line 132 which is coupled through inhibit OR gate 134. The output of the inhibit OR gate 134 is coupled to the light valve tape reader 28 and the printer motor 23. The inhibit signal from the OR gate 134 inhibits operation of the reader 28 and printer motor 23. The alternate output of the eighth hole flip-flop 128 is connected through the OR gate 118 to the nine millisecond clock. The clock runs causing the reader to step along its leader until the eighth hole is sensed. The eighth hole signal is fed via conductor 136 to the reset input of the eighth hole flip-flop 128. Upon reset of the flip-flop 128, the nine millisecond clock is stopped and the inhibit signal is lifted from the light valve tape reader 28 and the printer motor 23. The printer motor 23 starts developing operating speed and draws the film leader through the printer. Further, removal of the inhibit signal causes the light valve tape reader 28 to step off the leader and stop upon reaching the first eighth hole punch which indicates leader termination.

As illustrated in FIG. 1, the scene length tape 32 is provided with channel three and four punches in the row just prior to row one which indicates the start of the first scene length information and carries the channel eight hole punch. The combined channel three and four punches represent a binary number of twelve which is not used for coding the scene length information. As the leader is stepped, the tape reader 34 senses this punch combination and supplies a signal to both inputs of a discriminator AND gate 138. The output of the AND gate 138 is coupled via a conductor 140 to a bistable discriminator flip-flop 142 causing it to set. The flip-flop 142 is connected via conductor 143 to the remaining input of the inhibit OR gate 134. Upon setting of the discriminator flip-flop 142 an inhibit signal is removed from the light valve tape reader 28 and the printer motor 23. In the event the channel three and four punches are not present, as would be in the case if the scene length tape and light valve tape were interchanged, the reader 28 and printer 23 would not start upon setting of the channel eight hole flip-flop 128. This particular feature of the illustrated embodiment is particularly convenient since it prevents improper operation of the printer due to an unintentional intermix of the tapes by the operator. Since the printer is operated in a darkly lit environment, such a situation were it not for the described feature, would be quite possible.

As previously mentioned, the channel eight hole signal from the reader 34 actuates the nine millisecond clock which remains in operation for sixty-three milliseconds while the scene length information is transferred from the tape 32 to the storage unit 36. The channel eight hole reset signal is coupled through the switch 122 when in the milestone position and through the OR gate 114 and the switch 122 when in the batch position to reset the counter unit 40. Thus, in either switch position the counters are reset in response to the eight hole signal which corresponds to energization of the printer motor 23.

Operation

Upon the application of power to the cuer 12, power to the channel eight hole flip-flop 128 is delayed to prevent a malfunction of the cuer logic system. A moment after turn-on the channel eight hole flip-flop 128 sets, and a signal is passed through the OR gate 118 thus turning on the nine millisecond clock 46. Further operation of the tape reader 28 and printer motor 23 is inhibited by the signal on line 132 which is coupled through the OR gate 134. The nine millisecond clock 46 runs for a period suffifficient to sequentially advance the scene length tape reader until the channel eight hole is read by the tape reader. The channel eight hole indicates that the tape has sufficiently advanced to clear the leader and that the information following is scene length information in binary coded decimal form. Just prior to sensing of the channel eight hole the reader senses the combined channel 3 and 4 punches setting the discriminator flip-flop and removing the inhibit signal on line 143 generated by the flip-flop from the light valve tape reader and the printer motor.

The channel eight hole information is fed to the reset input of the eighth hole flip-flop 128 thereby resetting the flip-flop thus removing the channel eight hole inhibit signal and actuating the light valve tape reader. In response to the flip-flop reset, the printer motor 23 is started. The control signal is also coupled through the OR gate 114 for resetting the counter unit 40 and the clock control flip-flop 117. Upon reset of the eighth hole flip-flop 128, power is applied to the light valve tape reader 28 causing the tape reader to advance. As previously mentioned, the light valve tape 30 is punched in four rows. The first is blank except for the lead scene, and is provided with six punch columns. The light valve tape reader steps upon reset of the channel eight hole flip-flop 128 until the eighth hole is sensed thereby clearing the leader. The reader 28 stops. The clock control flip-flop 117 which was set by the channel eight hole control signal activates the nine millisecond clock thus stepping the scene length tape reader 34 through eight columns and storing in the storage unit a value which represents a film length less than the film leader. This assures that a cue signal will occur before the end of the leader so that the slides of the light source 20 will be set before the first scene cue is generated.

It will be appreciated that upon the application of power three sequential operations occur. First, the light valve tape reader 28 and printer motor 23 are inhibited while the scene length tape reader 34 advances to the channel eight hole. Secondly, the channel eight hole of scene length tape reader resets the eighth hole flip-flop 128 turning on the printer motor 23 and the light valve tape reader 28 and additionally setting the clock control flip-flop 117. Thirdly, reset of the flip-flop 128 allows the reader 28 to step off the leader until channel eight hole is reached. The film leader is now being drawn through the printer 10 while the printer motor 23 attains operational speed. While the leader of the film is passing through the printer, a cue signal is generated by the comparator unit 42 indicating coincidence between the storage unit 36 and the counter unit 40. In response to the cue signal, the tape reader 28 is activated and the tape information sets the slides storing the first scene information in the valve. The valve information relating to the first scene is set into the light source 20 memory in response to a cue generated during the film leader.

The operator has previously set the film format programmer 100 for the desired film format. For example, the film format programmer may be set to sixteen, corresponding to sixteen frames per linear foot of 35 mm. film. When the tens frames counter 96 reads one and unit frames counter 90 reads six, the tens 98 and units 92 program comparators detect a coincidence and provide a signal which resets the frame counters for the next count, and additionally causes the unit foot counter 104 to step one. The procedure is carried out until the counter detects a coincidence between the information stored in the storage unit 36, which in this case corresponds to the length of the film leader.

When the coincidence is detected, a second cue signal is fed to the OR gate 114 for setting the clock control flip-flop 117. The clock control flip-flop is then turned on for sixty-three milliseconds which corresponds to eight clock pulses and thus causes the scene length tape reader 34 to step eight positions. In the "batch" method of scene length measurements this information will be in the form of footage and frame length measured from the last cue signal to the start of the next scene. In the "milestone" method of scene length this information will be an updating of the previously stored information and will indicate the film length in footage and frames from an initial start position on the leader.

With the switch in the batch position, the cue signal sets the clock control flip-flop 117 and is coupled through the switch 122 to reset the film lapse counter 40. When the switch is in the milestone position, the cue signal sets only the clock control flip-flop. The cue signal is fed to the adjustable delay means 116 for actuation of the light valve tape reader 28. The delay is set so that the vanes are set at the scene line between scenes. As previously mentioned, the cue occurs slightly ahead of the desired subsequent scene. The inherent time delay in the controlled light source 20 is compensated by the delay means 116. The second cue occurs at the start of the first scene and transfers the information stored in the light source 20 to the vanes thereof and the slide memory is in turn set for the next scene. The above described procedure is repeated until the entire film has been printed.

While this invention has been particularly shown and described in connection with an illustrated embodiment, it will be understood that various changes in form and detail may be made without departing from the spirit and scope of the invention as set forth in the following claims.

What is claimed is:

1. An apparatus for monitoring the passage of film through a photographic film printer and for controlling the operation of the printer in accordance with the monitoring information wherein the printer includes a selectively controllable light source and a signal generator providing an output signal related to the quantity of film passing through the printer comprising:

means providing a signal indicating the length of a film scene in integral units of length greater than a frame and frames;

storage means for storing said integral units of length greater than a frame and frame information;

a counter unit connected to the signal generator and providing a progressive count in integral units of length and frames of the film passing through the printer, said counter unit including a frame counter driven by said generator and an integral unit length counter, said frame counter actuating said integral unit length counter when the frame count reaches a predetermined value equivalent to an integral unit of film length;

program means for selectively varying said predetermined value in accordance with the format of the film passing through the printer; and a comparator means for comparing the information in said storage means with the count of said counter and providing a signal to said printer upon the occurrence of a predetermined relation between the storage means and said counter unit.

2. The apparatus of claim 1 wherein said counter unit includes a frame comparator connected to said frame counter and said program means, said frame comparator providing a coincidence signal when the count of said frame counter coincides with said programmer, said coincident signal being fed to said unit length counter for recording and to said frame counter for reset thereof.

3. The apparatus of claim 2 wherein said cue signal from said comparator means is coupled to said variable light source for causing said light source to be set to a preferred value for a subsequent scene to be printed.

4. An apparatus for monitoring the passage of film through a photographic film printer and for controlling the operation of the printer in accordance with the monitoring information wherein the printer includes a selectively controllable light source and a signal generator providing an output signal related to the quantity of film passing through the printer comprising:

means providing a signal indicating the length of a film secene in integral units of length greater than a frame and frames;

storage means for storing said integral units of length greater than a frame and frame information;

a counter unit connected to the signal generator and providing a progressive count in integral units of length and frames of the film passing through the printer, said counter unit including a frame counter driven by said generator and an integral unit length counter, said frame counter actuating said integral unit length counter when the frame count reaches a predetermined value equivalent to an integral unit of film length;

a comparator means for comparing the information in said storage means with the count of said counter and providing a signal to said printer upon the occurrence of a predetermined relation between the storage means and said counter unit; and said counter unit further includes reset means for resetting said counter unit upon the application of a signal thereto and switch means connected between said reset means and said comparator means so that said cue signal from said comparator means may be selectively connected to said counter unit for reset thereof.

5. The apparatus of claim 4 wherein said signal providing means in addition to providing a signal indicating the length of a film scene provides a control signal and means coupling said control signal to said reset means of said counter unit for resetting said counter unit by said control signal.

6. An apparatus for monitoring the passage of film through a photographic film printer and for controlling the operation of a printer in accordance with the monitoring information wherein the printer includes a selectively controllable light source and a signal generator providing an output signal related to the quantity of film passing through the printer comprising:

means providing a signal indicating the length of a film scene in integral units of length greater than a frame and frames;

storage means for storing said integral units of length greater than a frame and frame information;

said storage means including display means providing a visual indication of the storage condition thereof;

a counter unit connected to the signal generator and providing a progressive count in integral units of length and frames of the film passing through the printer, said counter unit including a frame counter driven by said generator and an integral unit length counter, said frame counter actuating said integral unit length counter when the frame count reaches a predetermined value equivalent to an integral unit of film length, said counter means further including display means providing a visual indication of the count thereof so as to provide an instantaneous visual indication of the operation of the apparatus; and a comparator means for comparing the information in said storage means with the count of said counter and providing a signal to said printer upon the occurrence of a predetermined relation between the storage means and said counter unit.

7. An apparatus for monitoring the passage of film through a photographic film printer and for controlling the operation of the printer in accordance therewith, wherein the printer includes a selectively variable light source and a signal generator providing an output signal related to the rate of travel of the film through the printer comprising:

first means for playing back a recorded signal indicating the length of a film scene;

storage means for storing said scene length signal;

control means for controlling said first playback means and providing a control signal in response thereto;

a counter unit including reset means and connected to said signal generator and providing a progressive count of the film passing through said printer;

a comparator means comparing the condition of said storage means with the count of said counter unit and providing a cue signal to the printer upon the occurrence of a predetermined condition; and means for coupling said control signal to said reset means and second means for selectively coupling said cue signal to said reset means so that said counter resets upon the occurrence of a control signal and selectively resets upon the occurrence of said cue signal.

8. The apparatus of claim 7 wherein said second coupling means include a manually operable switch to permit selective reset of said counter by said cue signal.

9. The apparatus of claim 8, wherein said control signal from said first playback means is provided upon the commencement of the storage of said scene length signal into said storage means.

10. The apparatus of claim 7 which further includes second means for playing back a recorded signal indicating the desired lighting condition for control of the variable light source and wherein said cue signal is connected to said second playback means for control thereof.

11. The apparatus of claim 10 which further includes an adjustable time delay means connected between said comparator means and said second playback means for introducing a selectable delay to said cue signal.

12. The apparatus of claim 7 which further includes synchronization detection means, means operatively connecting said synchronization detection means to said first playback means in response to a predetermined position of said first playback means for sensing the playback information and means connected to said synchronization detection means for selectively controlling the operation of said printer in response to the playback information when in said predetermined position.

13. An apparatus for monitoring the passage of film through a photographic film printer and for controlling the operation of the printer in accordance therewith wherein the printer includes a selectively variable light source and a signal generator providing an output signal related to the rate of travel of the film through the printer comprising:

a first tape reader for stepping a first tape for playing back information related to the length of a film scene;

storage means connected to said first tape reader for storing the information upon said tape;

control means connected to said tape reader and said storage means for sequentially stepping the information from said tape into said storage means;

a counter connected to said signal generator and providing a progressive count of the length of film passing through said printer;

a second tape reader for stepping a second tape playing back information related to the lighting conditions for a selected scene the variable light source being connected to said second tape reader for control thereof;

a comparator means comparing the information in said storage means with the count of said counter and providing a cue signal upon the occurrence of a predetermined condition; and means connecting said cue signal to said second tape reader so that upon the occurrence of a cue signal information is transferred from said second tape by means of said second tape reader to said light variable light source.

14. The apparatus of claim 13 which further includes synchronization detection means, means operatively connecting said synchronization detection means to said second tape reader in response to a periodically reoccurring predetermined position of said tape for sensing the information thereon and a means connected to said synchronization detection means for selectively controlling the operation of said printer in response to the information upon said tape when in said predetermined position.

15. The apparatus of claim 14 which further includes an adjustable delay means connected between said comparator and said second tape reader serving to introduce a delay to said cue signal.

16. The apparatus of claim 13 which further includes a discriminator means coupled to said first tape reader for sensing a predetermined code upon said first tape and means for inhibiting the operation of said printer controlled by said discriminator means so that upon detection of said predetermined code said inhibit means is disabled, thus permitting the normal operation of said printer.

References Cited

UNITED STATES PATENTS

| | | | |
|---|---|---|---|
| 3,492,071 | 1/1970 | Limnios et al. | 355—83 |
| 3,374,723 | 3/1968 | Baumbach | 355—83 X |
| 3,586,438 | 6/1971 | Gyori | 355—83 X |

RICHARD L. MOSES, Primary Examiner

U.S. Cl. X.R.

355—88